United States Patent Office 2,875,211
Patented Feb. 24, 1959

2,875,211

BASIC DYESTUFFS FOR THE MANUFACTURE OF COLORED WRITING AGENTS

Heinrich Seibert, Leverkusen-Bayerwerk, Kurt Triebeneck, Koln-Deutz, and Berthold Bienert and Fritz Baumann, Leverkusen-Bayerwerk, Germany, assignors to Farbenfabriken Bayer Aktiengesellschaft, Leverkusen, Germany, a corporation of Germany No Drawing. Application July 26, 1955
Serial No. 524,584

Claims priority, application Germany July 29, 1954

8 Claims. (Cl. 260—314.5)

This invention relates to salts of basic azo, anthraquinone, phthalocyanine and dioxazine dyestuffs and to their application for the manufacture of colored writing agents.

It is known that document inks generally contain iron gallate body which is colored with an acid or substantive dyestuff. These inks, which per se are very fast to light, have the disadvantage that precipitation occurs in contact with air owing to oxidation or even after standing for a relatively long time; this precipitation is extremely undesirable, especially with fountain pen inks. It is the practice at present to reduce the content of iron gallate body to such a degree that quantitatively only slight precipitations are formed. However, such inks no longer constitute true document inks and can be completely removed in many cases, by fading, by reducing agents and other means.

It is an object of the present invention to provide dyestuff preparations which avoid the above disadvantages and can be used as document inks. A further object is to provide novel dyestuff preparations which can be used for ball-point pens and printing and stamp inks which produce writing or impressions of exceptional fastness to light and non-fading character. Another object is to provide novel dyestuffs which can be used for the dyeing of synthetics and plastics. Still further objects will appear hereinafter.

These objects are attained in accordance with the present invention by using the reaction products of basic azo-anthraquinone, phthalocyanine and dioxazine dyestuffs with inorganic acids or carboxylic acids, or sulphonic acids or acid esters of dibasic or polybasic acids.

Basic azo, anthraquinone, phthalocyanine and dioxazine dyestuffs within the meaning of the present invention are azo, anthraquinone, phthalocyanine and dioxazine dyestuffs which contain aliphatically bonded tertiary amino groups. Such dyestuffs may, for example be prepared according to the process of the copending application Ser. No. 475,821 by reacting azo, anthraquinone, phthalocyanine or dioxazine dyestuffs having replaceable halogen atoms with aliphatic tertiary amines which contain at least one further amino or imino group, or by reacting such dyestuffs having replaceable halogen atoms with aliphatic primary or secondary halogen amines and subsequent reaction with secondary aliphatic amines.

Any suitable saturated or unsaturated carboxylic acid of the aliphatic, araliphatic, hydroaromatic and aromatic series may be used as the acid component for the present invention. Examples of such carboxylic acids are: acetic acid, oenanthic acid, palmitic acid, oleic acid, stearic acid and benzoic acid. Moreover, aliphatic and aromatic sulfonic acids of any desired constitution are also suitable as the acid components for the process according to the invention. Furthermore, acid esters of dibasic or polybasic acids may also be used instead of carboxylic acids or sulfonic acids as the acid components for the present process. Examples of such acid esters are: oxalic acid monomethyl ester, malonic acid monobutyl ester, suberic acid, monohexyl ester, phthalic acid monooctyl ester and the like. There may be used also inorganic acids as, for example, hydrochloric acid.

The reaction of the basic dyestuffs with inorganic acids, carboxylic acid, sulfonic acids or acid esters according to the present invention is most easily effected in aqueous suspensions, but the reaction may in certain cases be carried out in an inert organic solvent in which the salt of the basic dyestuff is insoluble, e. g. in cyclohexane. Furthermore, the reaction can be carried out by mixing respectively kneading the reaction compounds without addition of solvents etc. In general, the reaction is carried out at room temperature but sometimes it may be of advantage to use elevated temperatures. The reaction products obtained in this manner may easily be isolated from the reaction mixture by filtration or evaporating the solvent.

The reaction products obtainable according to the present invention dissolve more or less satisfactorily, depending on the nature of the acid component employed in the manufacture thereof, in organic or inorganic solvents. For example, products which are specifically soluble in organic solvents are obtained if the acids or acid esters used for the reaction with the basic dyestuffs are those which contain an aliphatic or aromatic radical of relatively high molecular weight. On the other hand, water soluble salts are obtained by using hydrochloric acid or acetic acid.

By using dyestuff preparations which contain the products of the process, it is possible to manufacture writing agents (for example inks, ball-point pen pastes, inks for rubber stamp inking pads) which product writing or impressions which are fast to light and non-fading and which can be used as document inks.

Substances which have proved particularly suitable for the manufacture of ball-point pen pastes, printing and stamp inks and typewriter ribbon inks are the reaction products of basic phthalocyanine dyestuffs with carboxylic acids, sulfonic acids or acid esters of dibasic or polybasic acids which are of relatively high molecular weight and which contain an alkyl or aryl radical of relatively high molecular weight.

Inks which are prepared by using a water-soluble salt such as, for example the hydrochloride or acetate of a blue or green basic copper-phthalocyanine dyestuff have a high degree of fastness to light and do not produce deposits either as a result of oxidation agents or reduction agents, and impressions produced with these inks cannot be removed by chemical agents. Moreover, such inks prepared with products obtained according to the invention still maintain a sufficient fastness when mixed with dyestuffs having a lower degree of light-fastness.

Finally, plastics and plastic masses may also be dyed with the salts of basic azo, anthraquinone, phthalocyanine and dioxazine dyestuffs according to the present invention, it being readily possible, by suitable selection of the acid component of the dyestuff salt to adjust the necessary solubility of the plastic concerned.

The following examples serve to illustrate the invention without, in any way, limiting it.

*Example 1*

1000 grams of a dye base prepared from copper-phthalocyanine-di-trisulfochloride and 1-amino-3-dimethylaminopropane in accordance with Example 6 of the copending application Ser. No. 475,821 are mixed with 4000 cc. of water to form a thin paste, after which the mixture is screened, 600 grams of phthalic acid monooctyl ester are slowly added while stirring well and the final mixture is stirred for 2 hours at room temperature. The mixture is filtered with suction, initially dried for 12 hours in air at room temperature and then for 6 hours at 100° C. The product dissolves satisfactorily in thiodiglycol and glycol monomethyl ether and is practically insoluble in conventional solvents such as ethyl alcohol, benzene and esters.

The dye base prepared from copper-phthalocyanine-di-trisulfo chloride and 1-amino-3-dimethylamino propane is prepared as follows: To a solution of 10 parts of copper phthalocyanine in 100 parts of chlorosulfonic acid 21 parts of thionylchloride are slowly added at a temperature of 60–70° C. The reaction mixture is then heated for 4–5 hours to 112–113° C. until a sample is soluble in a 10% solution of pyridine and is insoluble in diethylamine water. The reaction mixture is cooled and poured onto ice. The precipitated copper phthalocyanine-(3)-di-trisulfochloride is filtered off with suction and washed with ice water to neutral reaction. The paste of the sulfochloride thus obtained is added to a solution of 10.72 parts of 1-amino-2-dimethylamino ethane in 38.5 parts of water, stirred for 12 hours at room temperature and then for one hour at 60° C. The basic dyestuff formed is filtered off and washed with hot water. It dissolves in dilute acetic acid with clear greenish-blue color.

Example 2

100 grams of a dye base prepared from copper-phthalocyanine-di-trisulfochloride and 1-amino-3-dimethylamino-propane according to Example 6 of the copending application Ser. No. 475,821 are mixed with 4000 cc. of water to form a thin paste, the mixture is then screened and mixed slowly with oleic acid at room temperature. After stirring for 2 hours, the mixture is filtered with suction and initially dried at room temperature for 12 hours and then at 100° C. The product obtained dissolves very readily in thiodiglycol, and glycol monoethyl ether, and is less soluble in benzene. The dyestuff is only sparingly soluble in ethyl alcohol and ester.

Example 3

If the equivalent amount of phthalic acid monobutyl ester is used in Example 1 instead of phthalic acid monooctyl ester, a product is obtained which has substantially the same solubility.

Example 4

1000 grams of a dye base prepared from copper-phthalocyanine-di-trisulfochloride and 1-amino-3-dimethylamino-propane in accordance with Example 6 of the copending application Ser. No. 475,821 are mixed to a paste with 4000 cc. of water and mixed with a solution consisting of 600 grams of Gersthofen wax S in 600 grams of benzene at a temperature of about 80° C. The mixture is stirred for 2 hours at 80° C., filtered with suction and dried in the usual manner. The product is readily soluble when bleached twice in double bleached Gersthofen wax S and in montan wax, but it is not soluble in the conventional organic solvents. Gersthofen wax S is one of the I. G. waxes, originally made at the Gersthofen plant. It is a montan wax consisting of high molecular fatty acids which are about 15 percent esterified, cf. "Economic Study of German Synthetic Waxes" (Steinle, J. V.), Office of Military Government for Germany (U. S.), P. B.—No. 11173, U. S. Department of Commerce Report, Washington, D. C. (1945).

Example 5

1000 grams of a dye base prepared from copper-phthalocyanine-di-trisulfochloride and 1-amino-3-dimethylamino-propane in accordance with Example 6 of the copending application Ser. No. 475,821 are mixed to a paste with 4000 cc. of water and mixed while stirring well with 600 grams of phthalyl acid monobenzyl ester. The mixture is stirred for a further 2 hours at 80° C. and after cooling it is filtered with suction and dried in the usual manner. The dyestuff obtained is very soluble in for example, thiodiglycol and glycol monomethyl ether and is practically insoluble in ethyl alcohol, benzene and esters.

Example 6

1000 grams of a dye base prepared from copper-phthalocyanine which contains 3–4 chloromethyl groups and 1-diethylamino-4-amino-n-pentane according to Example 12 of the copending application Ser. No. 475,821 are mixed by stirring with 3000 cc. of water and then mixed while stirring with 700 grams of oleic acid. After stirring for another hour at room temperature, the mixture is filtered with suction and dried. The dyestuff obtained in this manner is very soluble in benzene and oleic acid, but is practically insoluble in spirit and esters.

The dye base prepared from the copper phthalocyanine which contains 3–4 chloromethyl groups and 1-diethyl-amino-4-amino-n-pentane may be prepared as follows: 10 parts of a copper phthalocyanine, which contains 3–4 chloromethyl groups, are dissolved in a mixture of 20 parts of 1-diethylamino-4-amino-n-pentane and 20 parts of water, and heated for about 15 hours to 90–95° C. Upon addition of water the precipitated dyestuff is filtered off and washed with water. It is dissolved in 1.5 liters of 3% acetic acid, filtered in the presence of active carbon, and recovered from the solution by addition of sodium hydroxide solution and filtration. It is soluble in dilute acetic acid with clear greenish-blue color.

Example 7

1000 grams of a dye base prepared by reacting tetraphenyl copper-phthalocyanine-tetra-sulfochloride with 1-amino-3-dimethyl-amino-propane according to the process disclosed in the copending application Ser. No. 475,821 are mixed to a thin paste with 4000 cc. of water, screened, and mixed while stirring well with 600 grams of phthalic acid monooctyl ester. The mixture is stirred for 2 hours, at room temperature, filtered with suction and initially dried for 12 hours in air and then for several hours at 100° C. The product obtained in this manner is very soluble in thiodiglycol and glycol monomethyl ether, but it is practically insoluble in spirit, benzene and esters.

The dye base prepared from tetraphenyl copper phthalocyanine - tetra - sulfochloride with 1-amino-3-dimethyl-amino-propane may be prepared as follows: To a solution of 10 parts of 4,4',4'',4'''-tetraphenyl-copper-phthalocyanine in 100 parts of chlorosulfonic acid 5.5 parts of thioylchloride are dropwise added at 20–25° C. while stirring. Stirring is continued for 12 hours at room temperature. The reaction mixture is cooled and poured on ice. The precipitated sulfochloride is sucked off and washed with ice water to neutral reaction. The paste obtained is added to 21.8 parts of 1-amino-3-dimethyl-amino-propane and stirred for 12 hours at room temperature and thereafter for one hour at 60° C. The basic dyestuff obtained in good yield is filtered off and washed with water. It dissolves in dilute acetic acid with clear green color.

Example 8

15 parts by weight of the acetate of a basic phthalocyanine dyestuff prepared according to Example 6 of the copending application Ser. No. 475,821 (the acetate being prepared by mixing or kneading the basic phthalocyanine with acetic acid eventually in the presence of an inert diluent, as for example cyclohexane), 5 parts by weight of Viktoriareinblau B (Schultz, Farbstofftabellen, 7. Auflage, Bd. I, No. 822), 5–20 parts by weight of glycerine, 10–15 parts by weight of a thickening agent, for example dextrin, gum arabic, are dissolved in 1000 parts of water and if necessary filtered. In this manner, there is obtained an extremely fast document ink.

The phosphate of the aforementioned basic phthalocyanine dyestuff may also be used instead of the acetate thereof. The solution of the phthalocyanine dyestuff may if necessary be obtained with a solution of copper chloride or copper sulfate in water.

If desired, a solution of 50 parts of diphenyl guanidine in acetic acid may be added to the ink.

Example 9

500 parts by weight of the acetate of a green basic copper-phthalocyanine dyestuff according to Example 10 of the copending application Ser. No. 475,821 (the salt being prepared according to Example 8) are kneaded with 200 parts by weight of Diamantgrün G (Schultz, Farbstofftabellen, 7. Auflage, Bd. I, No. 760) and 300 parts by weight of kaolin with tragacanth thickening, compressed to form pencil leads and dried. In this way, there is obtained an indelible pencil lead.

The following procedure is described in Example 10 of copending application Ser. No. 475,821: To a solution of 10 parts of 4,4',4'',4'''-tetraphenyl-copper-phthalocyanine in 100 parts of chlorosulfonic acid 5.5 parts of thionylchloride are dropwise added at 20–25° C. while stirring. Stirring is continued for 12 hours at room temperature. The reaction mixture is cooled and poured on ice. The precipitated sulfochloride is sucked off and washed with ice water to neutral reaction. The paste obtained is added to 21.8 parts of diethyl-amino-4-amino-n-pentane and stirred for 12 hours at room temperature and thereafter for one hour at 60° C. The basic dyestuff obtained in good yield is filtered off and washed with water. It dissolves in dilute acetic acid with clear green color.

Example 10

7 parts of the blue dyestuff obtained according to Example 6 are mixed with dispersion of 3 parts of Viktoriablau base B (Schultz, Farbstofftabellen, 7. Auflage, Bd. I, No. 822) in 6 parts of olein and worked into a mixture of 10 parts of stearin, 10 parts of castor oil, 10 parts of sesame oil and 30 parts of Vaseline oil on a 3-roll stand. This mass may be used in the conventional manner for dyeing typewriter ribbons. The aforementioned dispersion of dyestuff in oleic acid may be further diluted with benzene hydrocarbons and is suitable for incorporation in stamping pad inks and also for improving printing inks.

Example 11

15 to 20 parts of a blue basic phthalocyanine dyestuff obtained according to Example 2 are dissolved in 20 to 30 parts of castor oil by heating on a water bath. Saturated alcohols, esters or ethers and alcohol ethers of relatively high molecular weight may also be added as solvents. According to the degree of viscosity required, 20 to 25 parts of colophonium or an alkyd resin modified with colophonium is added as thickening agent. Chlorinated aliphatic and aromatic hydrocarbons may also be used as thickening agents. These pastes are particularly suitable for filling ball-point pen cartridges.

Example 12

5 parts by weight of a basic dyestuff prepared from copper phthalocyanine-di-trisulfochloride and 1-amino-3-methylamino-propane according to Example 6 of the copending application Ser. No. 475,821 and 5 parts by weight of a basic oxazine dyestuff prepared according to Example 6 of the copending application Ser. No. 475,821 from chloranil and naphthyl amine, subsequent conversion of the reaction product into the sulfochloride with chlorosulfonic acid and thionyl chloride and reaction of the sulfochloride with 1-diethylamino-4-amino-n-pentane to the desired basic dyestuff are dissolved in 1 liter of, preferably softened, water under addition of a small amount of acetic acid, oxalic acid or malonic acid. The preparation of an ink is completed by addition of the usually applied agents for facilitating the fluidibility as for example glycerine, dextrine, carbon hydrates etc. and surface active components as alcohol, ox gall etc. The ink exhibits excellent stability towards most adulterants, especially towards hypochlorite solution being superior in this property to an ink based on iron gallate.

Example 13

15 parts by weight of a sulfochloride of the basic dyestuff obtained from 4 p-toluido-n-methyl-anthrapyrimidone and 1-amino-3-dimethylamino-propane according to Example 5 of the copending application Ser. No. 475,821 are reacted with 30 parts by weight of phthalic acid mono benzyl ester dissolved in 55 parts by weight of benzyl alcohol for 30 minutes at a temperature of 100° C. The dyestuff paste thus obtained can be diluted with higher alcohols or aromatic alcohols to obtain any desired viscosity.

The dye base prepared from 4-p-toluido-n-methyl-anthrapyrimidone and 1-amino-3-dimethylamino-propane may be prepared as follows: To a solution of 20 parts of 4-p-toluido-n-methyl-anthrapyrimidone in 200 parts of chlorosulfonic acid 34.3 parts of thionyl chloride are dropwise added at a temperature of 20–25° C. while stirring. Stirring is continued at room temperature until a sample is insoluble in diethyl amine water. The reaction mixture is poured onto a mixture of ice and sodium chloride, the precipitated, sulfochloride filtered off and washed with icy dilute sodium salt solution to neutral reaction. The paste obtained is added to a solution of 33.4 parts of 1-amino-3-dimethylamino-propane in 60 parts of water and stirred for 12 hours. Thereafter it is heated for half an hour to 70–80° C. The precipitated dyestuff is filtered off and washed with water. It dissolves in dilute acetic acid with bluish-red color.

Example 14

10 parts by weight of a basic azo dyestuff obtained according to Example 2 of the copending application Ser. No. 475,821 are dissolved in 500 parts of water while adding a small amount of acetic acid and a small amount of ethyl alcohol. Furthermore, glycerine may be added to avoid too fast drying. The solution is suited for stamp pads. The fastness to light is remarkably superior to those basic dyestuffs used before.

The basic azo dyestuff obtained according to Example 2 of copending application Ser. No. 475,821, may be prepared as follows: 10.9 parts of a dyestuff having the formula

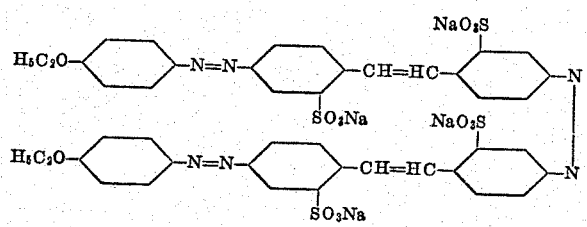

are reacted with 22 parts of phosphorous pentachloride in 33.5 parts of phosphorous oxychloride to obtain the sulfonyl chloride of the above azo dyestuff. The reaction mixture is diluted with acetone, the precipitated sulfonyl chloride filtered off, washed with gasoline and dried. The dry sulfonyl chloride is ground and then added to a mixture of 17.4 parts of 1-diethylamino-4-amino-n-pentane and 26.0 parts of water. This mixture is stirred for 12 hours at room temperature and then for one hour at 80° C. The basic dyestuff formed in good yield is filtered off with suction and washed with hot water. It may be used directly as a paste and is readily soluble in dilute acetic acid with yellow color.

We claim:

1. As a novel product, the salt of an acid selected from the group consisting of a hydrocarbon hydroaromatic monocarboxylic acid, hydrocarbon aromatic carboxylic acid, an alkyl monocarboxylic acid, an alkylene polycarboxylic acid, the corresponding acid alkyl esters of the polycarboxylic acids and a mineral acid, with a sulfonamide phthalocyanine dyestuff, said sulfonamide being substituted at the sulfonamide nitrogen atom with at least one di-lower alkylamino-lower alkylene radical.

2. A product of claim 1 wherein the acid is acetic acid and the dyestuff is a phthalocyanine dyestuff.

3. A product of claim 1 wherein the acid is oleic acid and the dyestuff is a phthalocyanine dyestuff.

4. A product of claim 1 wherein the acid is phthalic acid mono-octyl ester and the dyestuff is a phthalocyanine dyestuff.

5. A process for the production of novel dyestuffs which comprises reacting a sulfonamide phthalocyanine dyestuff, said sulfonamide being substituted at the sulfonamido nitrogen atom with at least one di-lower alkylamino-lower alkylene radical, with an acid selected from the group consisting of a hydrocarbon hydroaromatic monocarboxylic acid, hydrocarbon aromatic carboxylic acid, an alkyl monocarboxylic acid, an alkylene polycarboxylic acid, the corresponding acid alkyl esters of the polycarboxylic acids and a mineral acid.

6. The process of claim 1 in which the dyestuff is obtained by reacting the reaction product of a mixture of copper phthalocyanine disulfochloride and copper phthalocyanine trisulfochloride and 1-amino-3-dimethylamino propane with acetic acid and recovering the dyestuff formed.

7. The process of claim 1 in which the dyestuff is obtained by reacting a reaction product of a mixture of copper phthalocyanine disulfochloride and copper phthalocyanine trisulfochloride and 1-amino-3-dimethyl-amine propane with phthalic acid mono octyl ester and recovering the dyestuff formed.

8. The process of claim 1 in which the dyestuff is obtained by reacting the reaction product of a mixture of copper phthalocyanine disulfochloride and copper phthalocyanine trisulfochloride and 1-amino-3-dimethylamino propane with oleic acid and recovering the dyestuff formed.

References Cited in the file of this patent

UNITED STATES PATENTS

| | | |
|---|---|---|
| 2,285,359 | Rosch et al. | June 2, 1942 |
| 2,363,906 | Rossander | Nov. 28, 1944 |
| 2,414,050 | Linch | Jan. 7, 1947 |
| 2,416,387 | Haddock et al. | Feb. 25, 1947 |
| 2,479,491 | Haddock et al. | Aug. 16, 1949 |
| 2,542,328 | Haddock et al. | Feb. 20, 1951 |
| 2,744,914 | Rosch | May 8, 1956 |
| 2,776,957 | Bretano et al. | Jan. 8, 1957 |

FOREIGN PATENTS

| | | |
|---|---|---|
| 459,672 | Canada | Sept. 13, 1949 |
| 520,199 | Great Britain | Apr. 17, 1940 |
| 662,386 | Great Britain | Dec. 5, 1951 |